(12) United States Patent
Zimmerman et al.

(10) Patent No.: US 8,259,691 B2
(45) Date of Patent: Sep. 4, 2012

(54) SYSTEM AND METHOD FOR IDENTIFYING AN ACCESS POINT

(75) Inventors: Gary D. Zimmerman, Garden Valley, ID (US); Lyman Leonard Hall, Meridian, ID (US); Gregory F. Carlson, Corvallis, OR (US); Jeff James, Escondido, CA (US)

(73) Assignee: Marvell International Ltd. (BM)

( * ) Notice: Subject to any disclaimer, the term of this patent is extended or adjusted under 35 U.S.C. 154(b) by 265 days.

(21) Appl. No.: 11/849,937

(22) Filed: Sep. 4, 2007

(65) Prior Publication Data

US 2008/0056216 A1 Mar. 6, 2008

Related U.S. Application Data

(60) Provisional application No. 60/824,530, filed on Sep. 5, 2006, provisional application No. 60/871,539, filed on Dec. 22, 2006.

(51) Int. Cl.
*H04W 4/00* (2009.01)
(52) U.S. Cl. ........ 370/338; 370/310; 370/328; 370/349; 455/435.1; 455/432.2
(58) Field of Classification Search .... 455/435.1–435.3, 455/432.2; 370/310, 328, 338, 349
See application file for complete search history.

(56) References Cited

U.S. PATENT DOCUMENTS

| | | | |
|---|---|---|---|
| 2001/0014092 A1* | 8/2001 | Suzuki et al. | 370/389 |
| 2004/0100992 A1* | 5/2004 | Erlenborn et al. | 370/474 |
| 2004/0253969 A1* | 12/2004 | Nguyen et al. | 455/515 |
| 2005/0195781 A1* | 9/2005 | Ikeda | 370/338 |
| 2005/0243781 A1* | 11/2005 | Vesuna et al. | 370/338 |
| 2006/0015864 A1* | 1/2006 | Kang | 717/173 |
| 2006/0227972 A1* | 10/2006 | Brok et al. | 380/270 |
| 2008/0046545 A1* | 2/2008 | Koren et al. | 709/220 |

OTHER PUBLICATIONS

International Search Report mailed Jun. 12, 2008 for International Application No. PCT/US2007/77642.
Written Opinion of the International Searching Authority mailed on Jun. 12, 2008 for International Application No. PCT/US2007/77642.
Information technology—Telecommunications and information exchange between systems-Local and metropolitan area networks—Specific requirements—Part 11: Wireless LAN Medium Access Control (MAC) and Physical Layer (PHY) specifications; International Standard; ISO/IEC 8802-11; ANS/IEEE Std 802.11; (1999); First Edition; pp. 1-531.

* cited by examiner

*Primary Examiner* — Wayne Cai (57) ABSTRACT

An apparatus and method are disclosed to communicate, from a first device to a wireless device, information by which the wireless device may identify an access point as a potential network device. The information is encoded in a packet stream by the first device, and wirelessly communicated from the access point to the wireless device. The information may be encoded by varying a packet characteristic, such as packet length, that is preserved even if the packets are encoded by the access point. The information may include a beacon, a SSID and/or a key.

45 Claims, 7 Drawing Sheets

SYSTEM AND METHOD FOR IDENTIFYING AN ACCESS POINT

CROSS-REFERENCE TO RELATED APPLICATION

This application claims the benefit of U.S. Provisional Application No. 60/824,530 filed Sep. 5, 2006 and U.S. Provisional Application No. 60/871,539 filed Dec. 22, 2006, which is hereby incorporated herein by reference.

FIELD OF THE DISCLOSURE

The present disclosure is related to the field of wireless devices. More particularly, a technique is disclosed for communicating from a host to a wireless device data relating to a wireless access point.

BACKGROUND

A wireless network, such as a wireless local area network (WLAN), has at least one access point to communicate data between devices, such as a host and at least one wireless device. An access point typically broadcasts the data in broadcast packets having a service set identifier ("SSID") and the data. The wireless device is configured to identify broadcast packets intended for it based upon the SSID and disregard broadcast packets not having the correct SSID. The wireless device may also have a key to decode the broadcast packet SSID and data that may have been encoded by the access point.

In operation, one or more access points broadcast beacons. Each beacon has an SSID. The wireless device receives the beacons and determines whether to "connect" to an access point based upon the SSID and, in some cases, signal strength. An access point selected by a wireless device for communication may be referred to as a network device.

Once connected, the wireless device accepts broadcast packets having the SSID. The wireless device may then process the packet data in accord with its function. For example, the wireless device may be a printer and the packet data may be a bitmap.

To incorporate the wireless device in a network, the wireless device must first be configured with the correct SSID and key of an access point from which it may receive broadcast packets. Therefore, it would be desirable to provide a technique to wirelessly communicate information about an access point, such as a SSID and a key, from a host to a wireless device.

SUMMARY

The present invention is defined by the claims and nothing in this section should be taken as a limitation on those claims.

A technique is disclosed to communicate data from a host to a wireless device. The wireless device uses the data to identify an access point as a potential network device. The communication from the host is through a wireless signal and may include a beacon, a SSID and, if applicable, a key to configure the wireless device to communicate with the correct access point.

In a preferred embodiment, a wireless device has a processor to identify an access point as a network device based only upon data that may be referred to as recognition data. The recognition data is communicated to the wireless device by a host that encodes the recognition data in a broadcast packet stream by selectively changing the length of each broadcast packet. For example, a change in length between consecutive broadcast packets may correspond to binary "0", and no change in length between consecutive broadcast packets may correspond to binary "1". Even if an access point encodes the data of each broadcast packet before broadcasting, the relative length of each broadcast packet, as encoded, with respect to the other broadcast packets, as encoded, is preserved.

The processor receives from the access point the broadcast packet stream and compares the lengths of the broadcast packets to obtain the recognition data. Based upon the information conveyed by way of the recognition data, the processor may identify the access point as a network device in communication with the host.

If the access point communicating the recognition data does not encode the broadcast packets, the processor may identify the access point by its SSID that is included within a broadcast packet. If the access point communicating the recognition data encodes the broadcast packets, the processor may obtain the SSID from the recognition data generated by the host. Similarly, the processor may obtain a decoding key from the recognition data.

In one embodiment, the processor is configured to determine the signal strength of the access point that is communicating the recognition data and determine whether to use the access point as a network device based upon the signal strength. This embodiment may be particularly useful if the host can communicate with the wireless device through more than one access point. The processor will select as the network device the access point that it receives the recognition data from and has the strongest signal strength.

The preferred embodiments will now be described with reference to the attached drawings.

DETAILED DESCRIPTION OF THE PRESENTLY PREFERRED EMBODIMENTS

Figure 1:
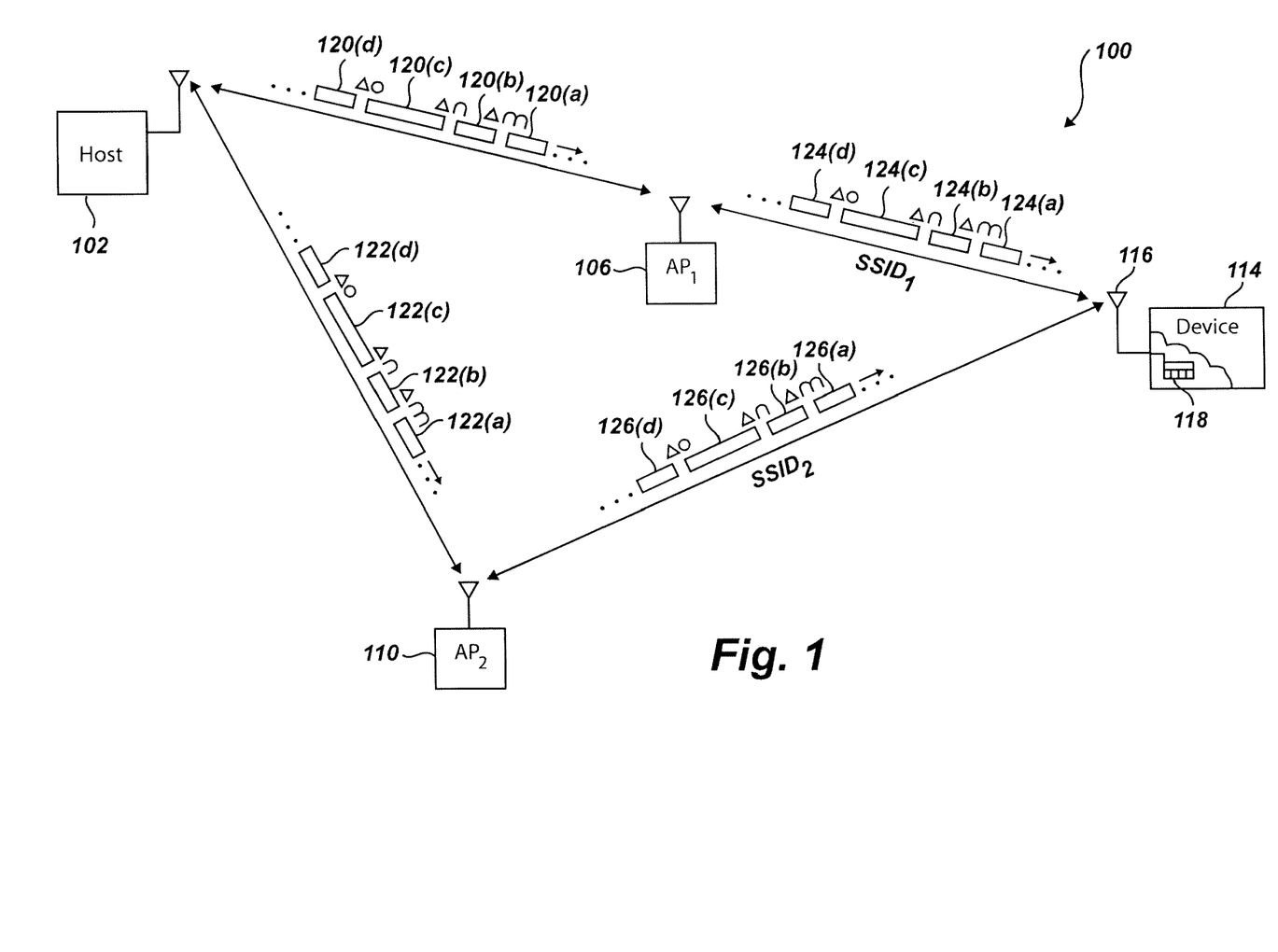
FIG. 1 is a diagram of an example of a wireless local area network that implements a preferred embodiment of the invention to configure a wireless device for communication with a correct access point.

FIG. 1 shows a wireless network 100 having a host device 102 that communicates data, which will hereinafter be referred to as recognition data, through at least one access point (e.g., AP$_1$ 106 and/or AP$_2$ 110) to a wireless device 114. The recognition data is for use by the wireless device 114 to identify, select, and/or otherwise recognize an access point, such as AP$_1$ 106 or AP$_2$ 110, as a network device. The recognition data may also or alternatively include an SSID, key, and/or other information for the wireless device 114.

In a preferred embodiment, the recognition data is comprised of bits that are each represented by a selectively changeable characteristic of the broadcast packets (e.g., 120(a) and 122(a)) communicated by the host device 102. The recognition data is preserved regardless of whether an access point $AP_1$ 106 and/or $AP_2$ 110 encodes the broadcast packets (e.g., 120(a) and 122(a)) because the characteristic changes equally, if at all, for all broadcast packets (e.g., 120(a) and 122(a)). The recognition data is not affected by the encoding. The wireless device 114 receives the recognition data by detecting the characteristic of each broadcast packet (e.g., 124(a) and 126(a)) as received.

Although the wireless network 100 example in FIG. 1 has two access points $AP_1$ 106 and $AP_2$ 110, the invention may be implemented in a wireless network having one, two, three, or any number of access points. It is also noted that the invention may be implemented in any type of wireless network such as a WLAN, Wi-Fi® network, fixed wireless data network, or other type of wireless network.

The host device 102 may be a desktop computer, laptop computer, or other device or component of a device configured to communicate to the wireless device 114. The wireless device 114 may be any type of wireless device such as a printer, scanner, camera, appliance, security system, entertainment center, other computer, or other system or device configured to communicate wirelessly with the host device 102. In addition, the host device 102 may be any of the aforementioned types of wireless devices.

In a preferred embodiment, the wireless device 114 has a processor 118 for receiving the broadcast packets (e.g., 124(a) and 126(a)). The processor 118 receives the broadcast packets (e.g., 124(a) and 126(a)) by way of a wireless receiver 116 such as a radio-frequency transceiver or other device configured to detect electromagnetic waves. The broadcast packets (e.g., 124(a) and 126(a)) may be communicated by any type of wireless connection standard, including IEEE 802.11, Wi-Fi®, Bluetooth®, wireless USB, HIPERLAN, or other standard now in existence or later developed. The processor 118 may communicate with the wireless receiver 116 directly or indirectly. The processor 118 may be a hardware, software, or firmware processor, or other device configured to process signals. The processor 118 may be implemented as a general, specific, dedicated, or other type of processing device. In a preferred embodiment, the processor 118 is an application specific integrated circuit (ASIC) having a firmware program to process the recognition data.

Preferably, the host device 102 has a processor (not shown) that encodes the recognition data by changing (or not changing) the length of each broadcast packet 120(a) to 120(d), and 122(a) to 122(d). In this embodiment length is the changeable characteristic referred to above. The host device 102 encodes the recognition data as a bit-stream according to a modified non-return-to-zero line code (NRZ). Each bit is encoded as a change or no change between the lengths of two broadcast packets in the broadcast packet stream. For example, binary "0" may be encoded as a change in packet length, and binary "1" may be encoded as no change in packet length.

In one embodiment, the host device 102 sends out either a four byte packet or an eight byte packet. Whenever a binary "0" is to be sent, the host device 102 toggles the packet length between four bytes and eight bytes. Whenever a binary "1" is to be sent, the host device 102 repeats the previous packet length. For example, the ASCII character "H" is represented by binary "01001000". The host device 102 may output the following broadcast packet stream, encoding ASCII "H":

| | bit number: | | | | | | | |
|---|---|---|---|---|---|---|---|---|
| | 1 | 2 | 3 | 4 | 5 | 6 | 7 | 8 |
| recognition data bit ("H"): | 0 | 1 | 0 | 0 | 1 | 0 | 0 | 0 |
| number of bytes in packet (length): | 4 | 8 | 8 | 4 | 8 | 8 | 4 | 8 | 4 |

Bit number 1 is "0" and is encoded by toggling the broadcast packet length from four bytes up to eight bytes. Bit number 2 is "1" and is encoded by repeating the broadcast packet length, in this case eight bytes. Bit number 3 is "0" and is encoded by toggling the broadcast packet length from eight bytes to four bytes. The remaining bits for the ASCII character "H" are similarly encoded by either toggling or not toggling the broadcast packet length.

FIG. 1 shows the host device 102 communicating three bits to the wireless device 114 according to the modified NRZ technique. The host device 102 is in communication with two access points $AP_1$ 106 and $AP_2$ 110. The communication link between the host device 102 and the access points $AP_1$ 106 and $AP_2$ 110 may be wireless or wired. The access points $AP_1$ 106 and $AP_2$ 110 are in communication with the wireless device 114. The host device 102 outputs a first bit "1" to the first access point $AP_1$ 106 by outputting two broadcast packets 120(a) and 120(b) having the same length. The host device 102 similarly outputs two broadcast packets 122(a) and 122(b) having the same length to the second access point $AP_2$ 110. Thus, $\Delta m$=binary "1". The third broadcast packets 120(c) and 122(c) are longer than the second broadcast packets 120(b) and 122(b), respectively. Thus, $\Delta n$=binary "0". The fourth broadcast packets 120(d) and 122(d) are shorter than the third broadcast packets 120(c) and 122(c), respectively. Thus, $\Delta o$=binary "0".

Regardless of whether $AP_1$ and $AP_2$ encode the broadcast packets, $\Delta m$, $\Delta n$, and $\Delta o$ do not change. In other words, the relative difference between the lengths of consecutive packets 124(a), 124(b), 124(c), and 124(d), and 126(a), 126(b), 126(c), and 126(d) does not change even if the broadcast packets are encoded.

Other techniques for representing the bits in the recognition data may be used, such as always having binary "1" represented by a first packet length and binary "0" represented by a second packet length. Also, more than two packet lengths may be used to represent single bits or groups of bits. For example, toggling from a first packet length to a second packet length may represent "00"; toggling from the first packet length to a third packet length may represent "01"; toggling from the second packet length to the third packet length may represent "10"; and toggling from the second packet length to the first packet length may represent "111".

The processor 118 receives the broadcast packets 124(a), 124(b), 124(c), and 124(d), and 126(a), 126(b), 126(c), and 126(d). In a preferred version, the recognition data represented by the broadcast packet stream indicates that the access points $AP_1$ 106 and $AP_2$ 110 are in communication with a host 102 attempting to communicate with the wireless device 114. Such recognition data may be referred to as beacon data and may be any signal recognized by the host device 102 and the processor 118 as such. If more than one access point is generating the beacon data, the processor 118 may select one of the access points as a network device based upon signal strength or other factors.

If the selected access point $AP_1$ 106 or $AP_2$ 110 is not encoding the broadcast packets, the processor 118 may read the service set identifier $SSID_1$ or $SSID_2$ directly from a received broadcast packet.

If the selected access point $AP_1$ 106 or $AP_2$ 110 is encoding the broadcast packets with a key, the processor 118 may receive the key by way of the recognition data. For example, the key may be input by a user at the host device 102, transmitted to the access points $AP_1$ 106 and $AP_2$ 110 as Δ-data, and communicated to the processor 118. The encoding technique may be wired equivalent privacy, Wi-Fi Protected Access®, or other type of security technique, encryption standard, or encoding scheme. The recognition data may optionally include parity and cyclic redundancy check data for processing by the processor 118.

The recognition data may be sent securely by implementing encryption/decryption at the host 102 and device 114. In this version, the host 102 and the device 114 share an encryption key. The encryption key is used by the host 102 to encrypt the recognition data and by the device 114 for decryption. The encryption key may be communicated to the host 102 and the device 114 by way of a user interface, as an example.

The accuracy and reliability of the recognition data received by the device 114 may be verified by implementing an error-detecting code at the host 102 and the device 114. For example, the host 102 and the device 114 may implement a cyclic redundancy check (CRC) function. The recognition data is applied to the CRC function at the host 102 to obtain a CRC value. The CRC value is transmitted as changes in broadcast packet length along with the recognition data. The device 114 receives the recognition data and the CRC value, applies the recognition data to the CRC function, and compares the resultant value to the CRC value that was received. If the values match, the accuracy of the recognition data is verified. If the values do not match, the device 114 may provide a signal to the host 102 to retransmit the recognition data.

Figure 2:
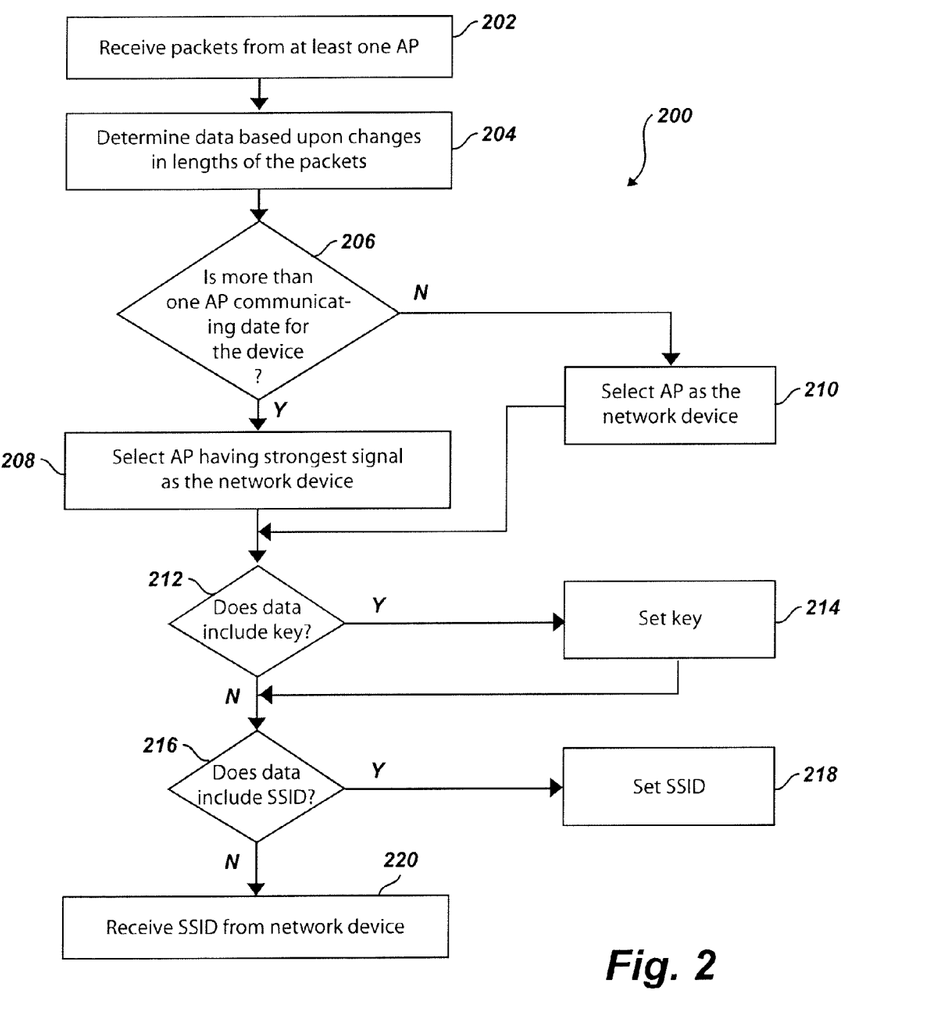
FIG. 2 is a flow chart showing preferred acts of a device for selecting an access point.

Referring to FIG. 2, Acts 200 are shown that may be implemented to select an access point based upon wireless data, such as recognition data. By way of example, one or more of the Acts 200 may be implemented as firmware in an ASIC, implemented as instructions on a computer readable storage medium, or implemented in another way in a wireless network to select an access point for a wireless device.

At Act 202, packets are received from at least one access point. The packets may be received by a processor, for example, either directly or by way of a device, circuit, or component such as a filter. Preferably, the packets are received by way of a broadcast packet stream. Recognition data (referred to as "data" in FIG. 2) is obtained from the packet stream by determining changes in lengths between broadcast packets (Act 204). In a preferred embodiment, the recognition data is obtained bit-by-bit by interpreting changes in packet lengths according to the modified NRZ technique discussed above.

At Act 206, it is determined whether more than one access point is communicating recognition data for reception by a wireless device. If only one access point is communicating the recognition data, then that access point is selected as the network device (Act 210). If more than one access point is communicating the recognition data to the device, then the access point having the stronger (or strongest) signal is selected as the network device (Act 208).

At Act 212, it is determined whether a key is included in the recognition data. If a key is included in the recognition data then the key is set (Act 214) for use to decode encoded packets.

At Act 216, it is determined whether a SSID is included in the recognition data. If a SSID is included in the recognition data then the SSID is set (Act 218). If a SSID is not included in the recognition data, then the SSID is preferably received from the access point/network device (Act 220) in a broadcast packet or other data transfer. Preferably the device is thereby configured to receive usable packet data consistent with a device function, although it is contemplated that other types of packet data may be received.

Referring now to FIGS. 3(*a*) to 3(*h*), various exemplary implementations of the present invention are shown. Referring to FIG. 3(*a*), the present invention may be embodied in a hard disk drive (HDD) 400. HDD 400 may communicate with a host device (not shown) such as a computer, mobile computing devices such as personal digital assistants, cellular phones, media or MP3 players and the like, and/or other devices via one or more wired or wireless communication links 408.

The present invention may be implemented with either or both signal processing and/or control circuits, which are generally identified in FIG. 3(*a*) at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406. HDD 400 may be connected to memory 409, such as random access memory (RAM), a low latency nonvolatile memory such as flash memory, read only memory (ROM) and/or other suitable electronic data storage.

Referring now to FIG. 3(*b*), the present invention may be implemented in a digital versatile disc (DVD) drive 410. The present invention may be implemented in either or both signal processing and/or control circuits, which are generally identified in FIG. 3(*b*) at 412, and/or mass data storage 418 of DVD drive 410. Signal processing and/or control circuit 412 and/or other circuits (not shown) in DVD drive 410 may process data, perform coding and/or encryption, perform calculations, and/or format data that is read from and/or data written to an optical storage medium 416. In some implementations, signal processing and/or control circuit 412 and/or other circuits (not shown) in DVD drive 410 can also perform other functions such as encoding and/or decoding and/or any other signal processing functions associated with a DVD drive.

Figure 3A:
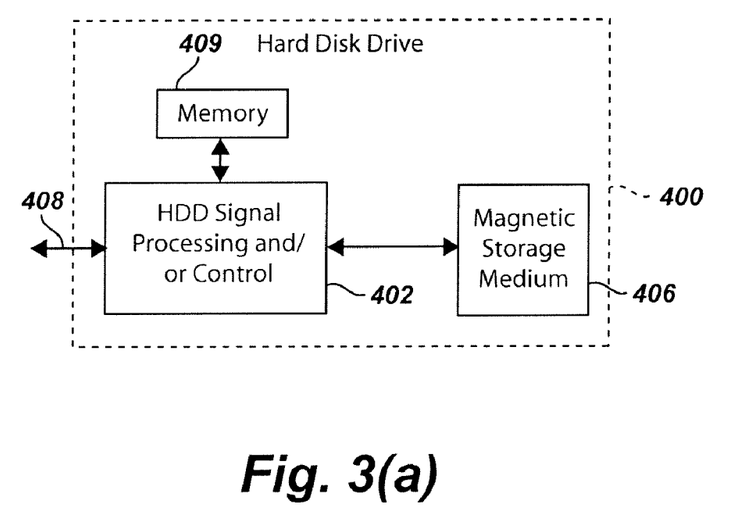
FIG. 3(a) is a functional block diagram of a hard disk drive.
Figure 3B:
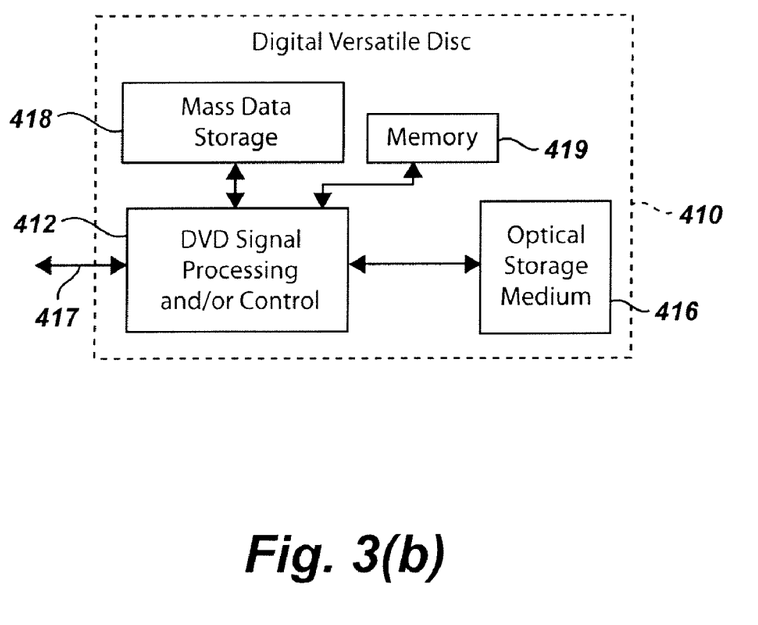
FIG. 3(b) is a functional block diagram of a digital versatile disk (DVD).

DVD drive 410 may communicate with a device (not shown) such as a computer, television or other device via one or more wired or wireless communication links 417. DVD drive 410 may communicate with mass data storage 418 that stores data in a nonvolatile manner. Mass data storage 418 may include a HDD such as that shown in FIG. 3(*a*). The HDD may be a mini HDD that includes one or more platters having a diameter that is smaller than approximately 1.8". DVD drive 410 may be connected to memory 419, such as RAM, ROM, low latency nonvolatile memory such as flash memory, and/or other suitable electronic data storage.

Referring now to FIG. 3(*c*) the present invention may be embodied in a high definition television (HDTV) 420. The present invention may be implemented in either or both signal processing and/or control circuits, which are generally identified in FIG. 3(*c*) at 422, a WLAN interface 429 and/or mass data storage 427 of the HDTV 420. HDTV 420 may receive HDTV input signals in either a wired or wireless format via one or more wired or wireless communication links 424 and generate HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

Figure 3C:
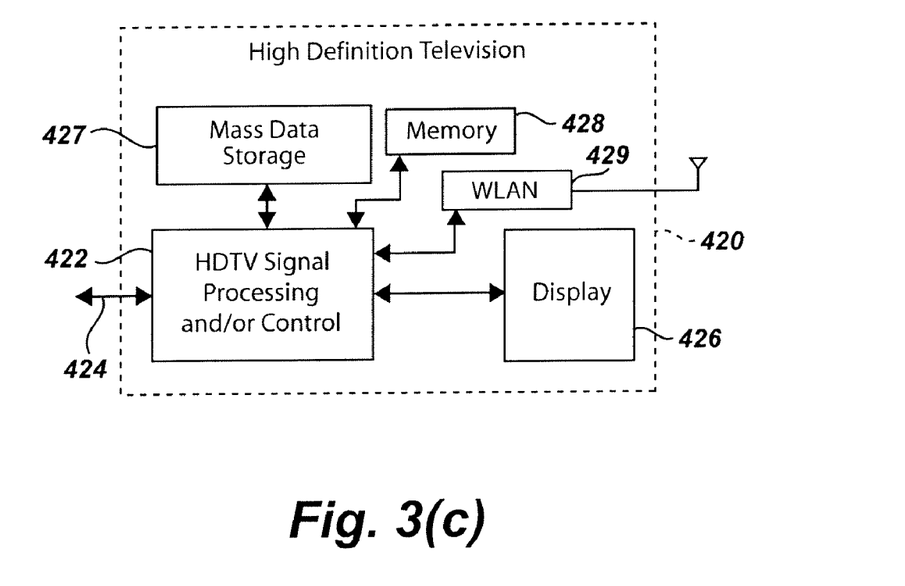
FIG. 3(c) is a functional block diagram of a high definition television.

HDTV 420 may communicate with mass data storage 427 that stores data in a nonvolatile manner such as optical and/or magnetic storage devices. At least one HDD may have the configuration shown in either FIG. 3(a) and/or at least one DVD may have the configuration shown in FIG. 3(b). The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Figure 3D:
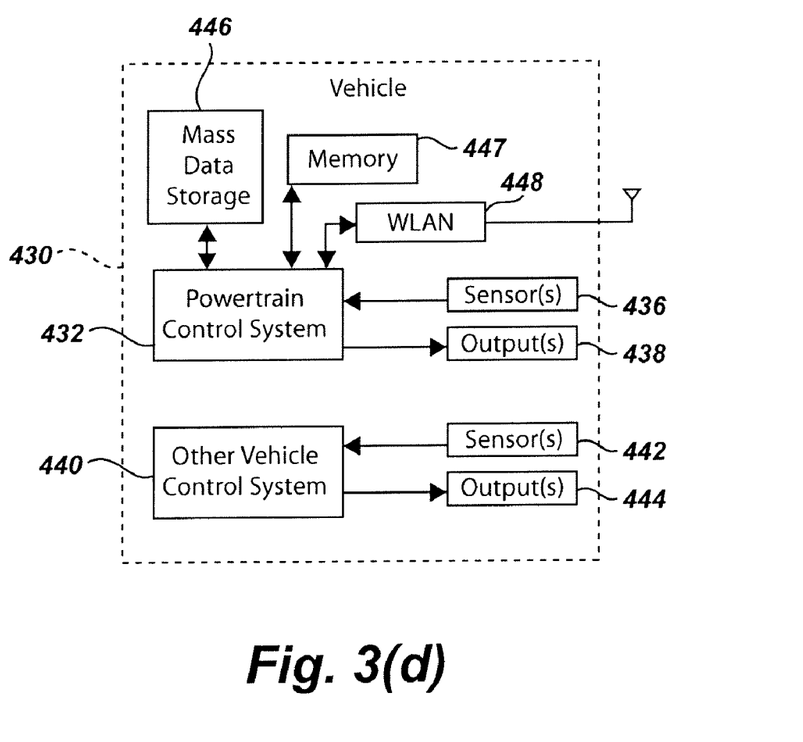
FIG. 3(d) is a functional block diagram of a vehicle control system.

Referring now to FIG. 3(d), the present invention may be implemented in a control system of a vehicle 430, a WLAN interface 448 and/or mass data storage 446 of the vehicle control system. In some implementations, the present invention is implemented in a power-train control system 432 that receives inputs from one or more sensors 436 such as temperature sensors, pressure sensors, rotational sensors, airflow sensors and/or any other suitable sensors and/or that generates one or more output control signals such as engine operating parameters, transmission operating parameters, and/or other control signals at one or more output(s) 438.

The present invention may also be embodied in other control systems 440 of vehicle 430. Control system 440 may likewise receive signals from input sensors 442 and/or output control signals to one or more output(s) 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices, for example HDDs and/or DVDs. At least one HDD may have the configuration shown in FIG. 3(a) and/or at least one DVD may have the configuration shown in FIG. 3(b). The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Figure 3E:
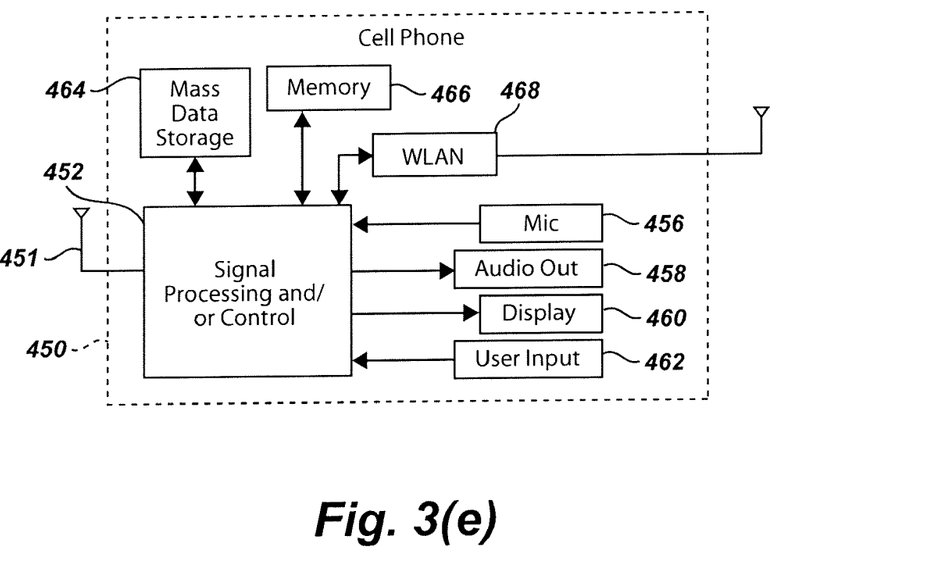
FIG. 3(e) is a functional block diagram of a cellular phone.

Referring now to FIG. 3(e), the present invention may be embodied in a cellular phone 450 that may include a cellular antenna 451. The present invention may be implemented in either or both signal processing and/or control circuits, which are generally identified in FIG. 3(e) at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices, for example HDDs and/or DVDs. At least one HDD may have a configuration shown in FIG. 3(a) and/or at least one DVD may have the configuration shown in FIG. 3(b). The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 3F:
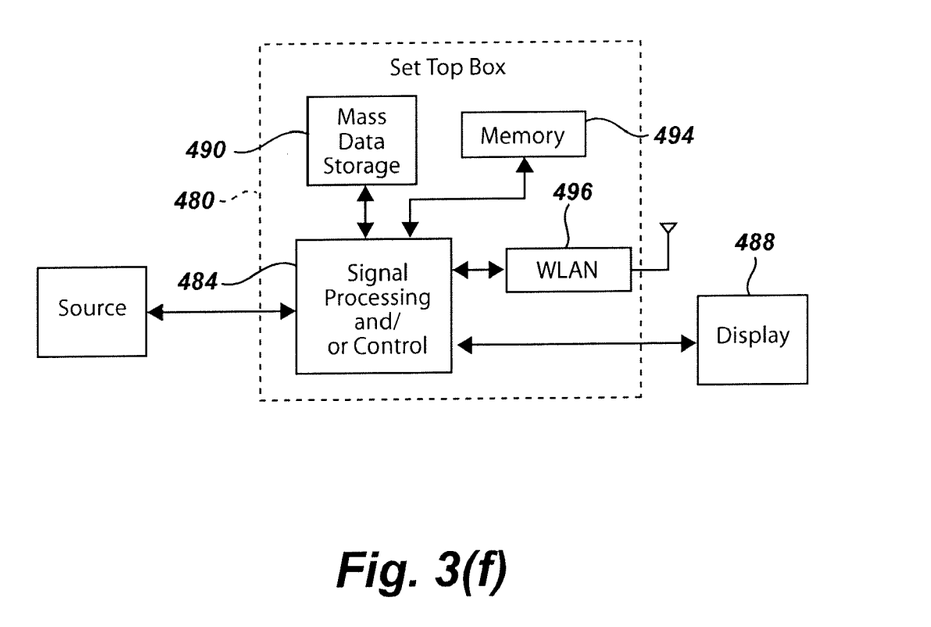
FIG. 3(f) is a functional block diagram of a set top box.

Referring now to FIG. 3(f), the present invention may be embodied in a set top box 480. The present invention may be implemented in either or both signal processing and/or control circuits, which are generally identified in FIG. 3(f) at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices, for example HDDs and/or DVDs. At least one HDD may have a configuration shown in FIG. 3(a) and/or at least one DVD may have the configuration shown in FIG. 3(b). The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 3G:
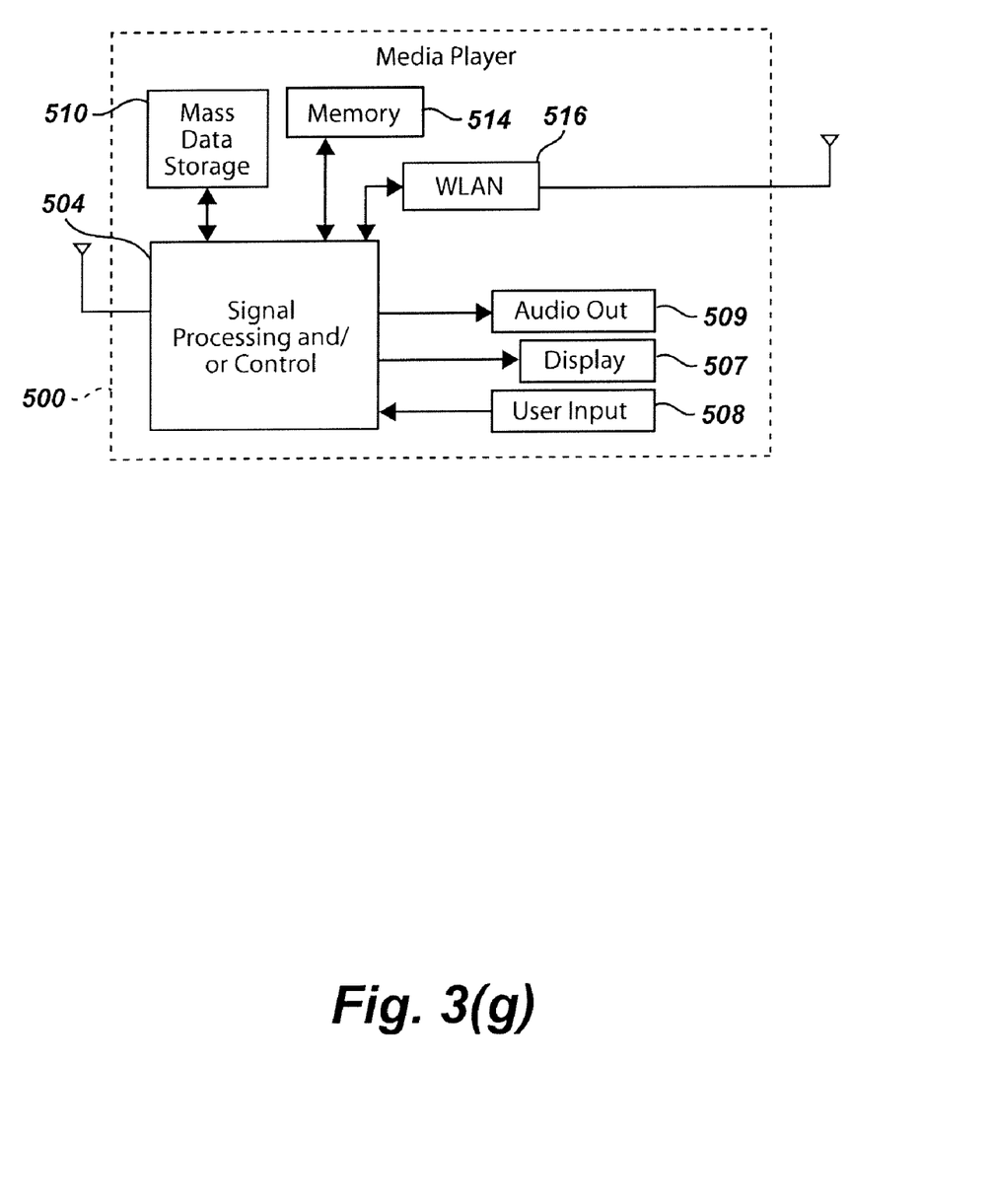
FIG. 3(g) is a functional block diagram of a media player.

Referring now to FIG. 3(g), the present invention may be embodied in a media player 500. The present invention may be implemented in either or both signal processing and/or control circuits, which are generally identified in FIG. 3(g) at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices, for example HDDs and/or DVDs. At least one HDD may have a configuration shown in FIG. 3(a) and/or at least one DVD may have the configuration shown in FIG. 3(b). The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

Figure 3H:
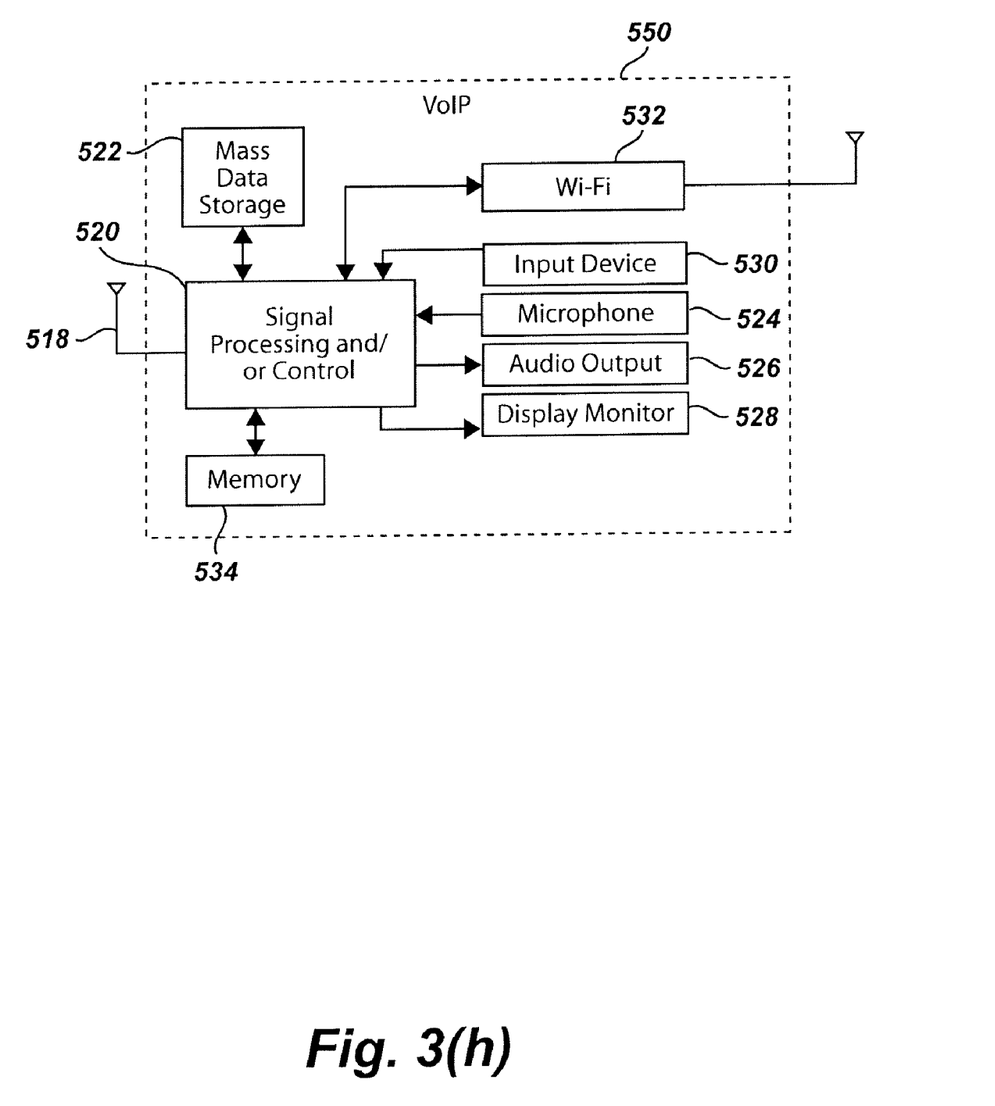
FIG. 3(h) is a functional block diagram of a Voice over Internet Protocol phone.

Referring to FIG. 3(h), the present invention may be embodied in a Voice over Internet Protocol (VoIP) phone 550 that may include an antenna 518. The present invention may be implemented in either or both signal processing and/or control circuits, which are generally identified in FIG. 3(h) at 520, a wireless interface and/or mass data storage of the VoIP phone 550. In some implementations, VoIP phone 550 includes, in part, a microphone 524, an audio output 526 such as a speaker and/or audio output jack, a display monitor 528, an input device 530 such as a keypad, pointing device, voice actuation and/or other input devices, and a Wi-Fi communication module 532. Signal processing and/or control circuits 520 and/or other circuits (not shown) in VoIP phone 550 may process data, perform coding and/or encryption, perform calculations, format data and/or perform other VoIP phone functions.

VoIP phone 550 may communicate with mass data storage 522 that stores data in a nonvolatile manner such as optical and/or magnetic storage devices, for example HDDs and/or DVDs. At least one HDD may have a configuration shown in FIG. 3(a) and/or at least one DVD may have the configuration shown in FIG. 3(b). The HDD may be a mini HDD that includes one or more platters having a diameter that is smaller than approximately 1.8". VoIP phone 550 may be connected to memory 534, which may be a RAM, ROM, low latency nonvolatile memory such as flash memory and/or other suitable electronic data storage. VoIP phone 550 is configured to establish communications link with a VoIP network (not shown) via Wi-Fi communication module 532.

All of the discussion above, regardless of the particular implementation being described, is exemplary in nature, rather than limiting. For example, although selected aspects, features, or components of the implementations are depicted as hardware or software, all or part of the systems and methods consistent with the wireless network 100 may be stored on, distributed across, or read from machine-readable media, for example, secondary storage devices such as hard disks, floppy disks, and CD-ROMs; a signal received from a network; or other forms of ROM or RAM either currently known or later developed.

Furthermore, although specific components of the wireless network 100 are described, methods, systems, and articles of manufacture consistent with the network may include additional or different components. For example, the host device 102, $AP_1$ 106, $AP_2$ 110, the wireless device 114, and/or the processor 118 may be implemented by one or more of: control logic, hardware, a microprocessor, microcontroller, application specific integrated circuit (ASIC), discrete logic, or a combination of circuits and/or logic. Any act or combination of acts may be stored as instructions in computer readable storage medium. Memories may be DRAM, SRAM, Flash or any other type of memory. Programs may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An apparatus comprising:
a wireless receiver configured to receive, from an access point, a wireless signal having a plurality of broadcast packets communicated from a host device; and
a processor in communication with the wireless receiver and configured to:
identify the access point as a network device based upon the plurality of broadcast packets;
wherein the processor is configured to determine recognition data from the plurality of broadcast packets based on detecting a variance in format among the plurality of broadcast packets; and
wherein the wireless signal having a plurality of broadcast packets comprises a packet stream having a first broadcast packet and a second broadcast packet, and wherein the processor is configured to detect the variance in format among the plurality of broadcast packets by comparing the first broadcast packet with the second broadcast packet to determine a difference between the first broadcast packet and the second broadcast packet, the difference being indicative of the recognition data.

2. The apparatus of claim 1 wherein the processor is configured to identify the network device without reference to a service set identifier.

3. The apparatus of claim 1 wherein the processor is configured to receive from the access point a service set identifier communicated by way of the recognition data.

4. The apparatus of claim 1 wherein the processor is configured to identify the access point as the network device without any access point security setting information.

5. The apparatus of claim 1 wherein the processor is configured to receive the plurality of broadcast packets from the access point and determine a service set identifier by comparing lengths of the plurality of broadcast packets.

6. The apparatus of claim 1 wherein the processor is configured to receive, from the access point, a key, wherein the key is received by way of the recognition data.

7. The apparatus of claim 1 wherein the processor is configured to receive beacon data from the access point, wherein the beacon data is not included within any broadcast packet communicated from the host device and the access point.

8. The apparatus of claim 1 wherein the processor is configured to receive the plurality of broadcast packets from the access point and determine the recognition data by comparing broadcast packet lengths.

9. The apparatus of claim 1 wherein the processor is configured to determine the recognition data based upon a non-return-to-zero line code.

10. The apparatus of claim 1 wherein the processor is configured to assess the access point based upon signal strength.

11. The apparatus of claim 1 wherein the processor comprises an application specific integrated circuit having firmware.

12. The apparatus of claim 1 wherein detecting the variance in the format among the plurality of broadcast packets comprises detecting a variance in length among the plurality of broadcast packets.

13. An apparatus comprising:
means for receiving, from an access point, a wireless signal having a plurality of broadcast packets communicated from a host device;

means for identifying the access point as a network device based upon the plurality of broadcast packets,
wherein the means for identifying determines recognition data from the plurality of broadcast packets based on detecting a variance in format among the plurality of broadcast packets; and
wherein the wireless signal having a plurality of broadcast packets comprises a packet stream having a first broadcast packet and a second broadcast packet, and wherein the means for identifying detects the variance in format among the plurality of broadcast packets by comparing the first broadcast packet with the second broadcast packet to determine a difference between the first broadcast packet and the second broadcast packet, the difference being indicative of recognition data.

14. The apparatus of claim 13 further comprising means for identifying the network device without reference to a service set identifier.

15. The apparatus of claim 13 further comprising means for receiving, from the access point, a service set identifier.

16. The apparatus of claim 15 further comprising means for identifying the access point as the network device without any access point security setting information.

17. The apparatus of claim 15 further comprising means for receiving the plurality of broadcast packets from the access point and determining a service set identifier by comparing lengths of the plurality of broadcast packets.

18. The apparatus of claim 15 further comprising means for receiving, from the access point, a key, wherein the key is received by way of the recognition data.

19. The apparatus of claim 15 further comprising means for receiving beacon data from the access point, wherein the beacon data is not included within any broadcast packet communicated from the host device and the access point.

20. The apparatus of claim 15 further comprising means for receiving the plurality of broadcast packets from the access point and determining the recognition data by comparing broadcast packet lengths.

21. The apparatus of claim 15 further comprising means for determining the recognition data based upon a non-return-to-zero line code.

22. The apparatus of claim 15 further comprising means for assessing the access point based upon signal strength.

23. The apparatus of claim 13 wherein detecting the variance in the format among the plurality of broadcast packets comprises detecting a variance in length among the plurality of broadcast packets.

24. A method comprising:
receiving, from an access point, a wireless signal having a plurality of broadcast packets communicated from a host device;
identifying the access point as a network device based upon the plurality of broadcast packets; and
determining recognition data from the plurality of broadcast packets based on detecting a variance in format among the plurality of broadcast packets; and
wherein the wireless signal having a plurality of broadcast packets comprises a packet stream having a first broadcast packet and a second broadcast packet, and wherein detecting a variance in format among the plurality of broadcast packets comprises determining a difference between the first broadcast packet and the second broadcast packet, the difference being indicative of the recognition data.

25. The method of claim 24 further comprising identifying the network device without reference to a service set identifier.

26. The method of claim 24 further comprising receiving, from the access point, a service set identifier.

27. The method of claim 24 further comprising identifying the access point as the network device without any access point security setting information.

28. The method of claim 24 further comprising:
receiving the plurality of broadcast packets from the access point; and
determining a service set identifier by comparing broadcast packet lengths.

29. The method of claim 24 further comprising receiving, from the access point, a key, wherein the key is received by way of the recognition data.

30. The method of claim 24 further comprising receiving beacon data from the access point, wherein the beacon data is not included within any broadcast packet communicated from the host device and the access point.

31. The method of claim 24 further comprising receiving plurality of broadcast packets from the access point and determining the recognition data by comparing broadcast packet lengths.

32. The method of claim 24 further comprising determining the recognition data based upon a non-return-to-zero line code.

33. The method of claim 24 further comprising assessing the access point based upon signal strength.

34. The method of claim 24 wherein detecting the variance in the format among the plurality of broadcast packets comprises detecting a variance in length among the plurality of broadcast packets.

35. A tangible computer readable storage medium having processor executable instructions to receive, from a wireless receiver, a signal having a plurality of broadcast packets communicated from a host device and to identify an access point as a network device based upon the plurality of broadcast packets,
wherein, when executed, the processor executable instructions are operable to determine recognition data from the plurality of broadcast packets based on detecting a variance in format among the plurality of broadcast packets; and
wherein the wireless signal having a plurality of broadcast packets comprises a packet stream having a first broadcast packet and a second broadcast packet, and wherein detecting a variance in format among the plurality of broadcast packets comprises determining a difference between the first broadcast packet and the second broadcast packet, the difference being indicative of the recognition data.

36. The tangible computer readable storage medium of claim 35 further comprising processor executable instructions to identify the network device without reference to a service set identifier.

37. The tangible computer readable storage medium of claim 35 further comprising processor executable instructions to receive, from the wireless receiver, a service set identifier communicated by the access point.

38. The tangible computer readable storage medium of claim 35 further comprising processor executable instructions to identify the access point as the network device without any access point security setting information.

39. The tangible computer readable storage medium of claim 35 further comprising processor executable instructions to obtain a service set identifier from the recognition data.

40. The tangible computer readable storage medium of claim 35 further comprising processor executable instructions to obtain a key from the recognition data.

41. The tangible computer readable storage medium of claim 35 further comprising processor executable instructions to receive from the wireless receiver beacon data, wherein the beacon data is not read from any broadcast packet.

42. The tangible computer readable storage medium of claim 35 further comprising processor executable instructions to determine the recognition data by comparing broadcast packet lengths.

43. The tangible computer readable storage medium of claim 35 further comprising processor executable instructions to determine the recognition data based upon a non-return-to-zero line code.

44. The tangible computer readable storage medium of claim 35 further comprising processor executable instructions to assess the access point based upon signal strength.

45. The tangible computer readable storage medium of claim 35 wherein detecting the variance in the format among the plurality of broadcast packets comprises detecting a variance in length among the plurality of broadcast packets.

* * * * *